United States Patent
Matsuo

(10) Patent No.: US 10,902,438 B2
(45) Date of Patent: Jan. 26, 2021

(54) INFORMATION PROCESSING SYSTEM, INFORMATION PROCESSING APPARATUS, AND INFORMATION PROCESSING METHOD TO DESIGNATE INCENTIVES FOR CONTENT TRANSFER

(75) Inventor: Takashi Matsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 1104 days.

(21) Appl. No.: 12/435,868

(22) Filed: May 5, 2009

(65) Prior Publication Data

US 2010/0004988 A1   Jan. 7, 2010

(30) Foreign Application Priority Data

May 13, 2008   (JP) .................... 2008-126360

(51) Int. Cl.
*G06Q 30/02* (2012.01)

(52) U.S. Cl.
CPC ......... *G06Q 30/02* (2013.01); *G06Q 30/0214* (2013.01); *G06Q 30/0224* (2013.01)

(58) Field of Classification Search
CPC . G06Q 30/02; G06Q 30/0224; G06Q 30/0214
USPC ....................................................... 705/14.16
See application file for complete search history.

(56) References Cited

U.S. PATENT DOCUMENTS

| | | | | |
|---|---|---|---|---|
| 6,134,533 A * | 10/2000 | Shell | ....................... | G06Q 20/10 705/14.4 |
| 2002/0077988 A1* | 6/2002 | Sasaki et al. | ................... | 705/59 |
| 2002/0161640 A1* | 10/2002 | Wolfe | ............................. | 705/14 |
| 2003/0149665 A1* | 8/2003 | Terada | ............................ | 705/40 |
| 2005/0203801 A1* | 9/2005 | Morgenstern | ...... | G06Q 30/0249 705/14.16 |
| 2007/0150359 A1* | 6/2007 | Lim | ..................... | G06Q 20/123 705/14.69 |
| 2008/0162233 A1* | 7/2008 | Rothschild | ............. | G06Q 30/00 705/329 |

(Continued)

FOREIGN PATENT DOCUMENTS

| | | |
|---|---|---|
| JP | 2002-269508 | 9/2002 |
| JP | 2003-016336 | 1/2003 |

(Continued)

OTHER PUBLICATIONS

"NFCNews: RFID in SD Cards", by John Wehr. SecureIDNews. Apr. 3, 2005. (Year: 2005).*

(Continued)

*Primary Examiner* — William A Brandenburg
(74) *Attorney, Agent, or Firm* — Chip Law Group

(57) ABSTRACT

An information processing apparatus is provided and operates as a managing server that distributes incentive using transfer device information with respect to content. A communication unit receives inter-device transfer information with respect to output content from an information providing device, the information being in the form of device identifiers for at least the information providing device and one or more user devices that executed content transfers. A controller then executes processing to designate the incentive recipients as being the device managers associated with the acquired device identifiers. In so doing, incentive can be distributed to the managers or users of user devices that relay content between an information providing device and a product purchaser.

30 Claims, 5 Drawing Sheets

(56) References Cited

U.S. PATENT DOCUMENTS

| | | | |
|---|---|---|---|
| 2008/0172291 A1* | 7/2008 | Hurowitz | G06Q 30/02 705/14.1 |
| 2008/0192932 A1* | 8/2008 | Graeber | G06K 7/0008 380/258 |
| 2009/0132366 A1* | 5/2009 | Lam et al. | 705/14 |
| 2009/0143104 A1* | 6/2009 | Loh | G06Q 20/352 455/558 |
| 2012/0084132 A1* | 4/2012 | Khan | G06Q 20/3278 705/14.26 |
| 2012/0135681 A1* | 5/2012 | Adams | H04B 5/0025 455/41.1 |
| 2013/0304551 A1* | 11/2013 | Oliver | H04N 21/2543 705/14.16 |

FOREIGN PATENT DOCUMENTS

| | | |
|---|---|---|
| JP | 2006-268821 | 10/2006 |
| JP | 2007-304634 | 11/2007 |

OTHER PUBLICATIONS

Japanese Office Action dated Jul. 24, 2012 for corresponding Japanese Appln. No. 2008-126360.

\* cited by examiner

INFORMATION PROCESSING SYSTEM, INFORMATION PROCESSING APPARATUS, AND INFORMATION PROCESSING METHOD TO DESIGNATE INCENTIVES FOR CONTENT TRANSFER

CROSS REFERENCES TO RELATED APPLICATIONS

The present application claims priority to that disclosed in Japanese Priority Patent Application JP 2008-126360 filed in the Japan Patent Office on May 13, 2008, the entire content of which is hereby incorporated by reference.

BACKGROUND

Digital signage is a system wherein advertisements or other information is displayed and provided to users on displays installed in public places and shops, for example. Other systems provide posters with microchips that can communicate at close-range, and include functions for outputting information from the microchip to a user's smart card (i.e., an integrated circuit card). In recent years, such systems have come to be used.

In one exemplary system, an IC and antenna are provided to equip digital signage or a smart poster with an RFID (Radio Frequency IDentification) tag enabling contactless communication. When a user's smart card with contactless communication functions is brought near the RFID tag, information stored in the memory of the RFID tag (such as product information) is transmitted to the user's smart card and accumulated in internal memory.

When utilizing the information accumulated in the smart card, the user touches or holds up the smart card to a PC having read/write (R/W) functions, thereby outputting the accumulated information in the smart card to the PC, and enabling the accumulated information to be displayed on the display of the PC. An information provision system like the above is disclosed in Japanese Unexamined Patent Application Publication No. 2002-269508, for example.

Furthermore, an advertising technique referred to as affiliate marketing has also come into use as a new advertising technique in recent years. In affiliate marketing, links to advertisement sites or retail sites for various products are established on blogs or informational websites, for example. If viewers of the blogs or websites then view the linked advertisement sites or retail sites, incentive is paid to the provider of the blog or informational site with the established links. In many cases, the number of views of the product advertisement sites or retail sites are counted, and incentive is paid according to the count.

Affiliate marketing is typically used on blogs or websites on the Internet, in a structure wherein a count is kept for the number of times a linked advertisement site or product retail site is accessed, and incentive is computed on the basis of management information in a management server that computes incentive.

However, in affiliate marketing systems of the related art, only the number of direct accesses is monitored for a link established on a blog or website with respect to a product advertisement product retail site. For example, a given user A may acquire product information with his or her own user device and subsequently provide the acquired information to another user B, but most systems are not configured to pay incentive to user A in this case. Thus there is a problem in that, if user B purchases a product, then even though user A has contributed to user B's process of purchasing the product, the providing of product information to user B by user A is not tracked in current affiliate systems.

SUMMARY

The present disclosure relates to an information processing system, an information processing apparatus, an information processing method, and a computer program product. More particularly, the present disclosure relates to an information processing system, an information processing apparatus, an information processing method, and a computer program product whereby inter-device transfer of content (such as product information provided by digital signage or other devices) is tracked, and incentive is distributed using the tracking information.

Being devised in light of the problems described above by way of example, the present disclosure provides an information processing system, an information processing apparatus, an information processing method, and a computer program product whereby product information transfer among user devices is tracked, thereby enabling the provision of incentive or other rewards to those who transfer product information.

An information processing apparatus in accordance with a first embodiment operates as a managing server that distributes incentive using transfer device information with respect to content, and includes: a communication unit configured to receive inter-device transfer information for output content from an information providing device, the information being in the form of device identifiers for at least the information providing device and one or more user devices that executed content transfers; and a controller configured to execute processing to designate the incentive recipients as being the device managers associated with the acquired device identifiers.

Furthermore, in the information processing apparatus in accordance with an embodiment, the controller may be configured to execute processing to designate the incentive recipients as being the manager of the information providing device and the device manager associated with the device identifier of the user device that transmitted the content to a user device that executed a product purchase on the basis of viewing the content.

Furthermore, in the information processing apparatus in accordance with an embodiment, the controller may be configured to execute processing to designate the incentive recipients as being the manager of the information providing device and the device managers associated with the device identifiers of all devices on the content transfer route leading to the user device that transmitted the content to a user device that executed a product purchase on the basis of viewing the content.

Furthermore, in the information processing apparatus in accordance with an embodiment, the managing server may be configured to dynamically set or modify the incentive distribution ratios for the incentive recipients.

An information processing apparatus in accordance with a second embodiment operates as a user device that acquires output content from an information providing device, or executes inter-device transfer of such content, and includes: a communication unit configured to receive content from the information providing device or another user device, while also receiving an identifier for the information providing device as well as an identifier for the content transmitting user device; a storage unit configured to store data received by the communication unit; and a controller configured such that, when transmitting content stored in the storage unit, the controller configures the transmission data to be content together with both the identifier of the information providing device and the device identifier of the apparatus itself.

Furthermore, in the information processing apparatus in accordance with an embodiment, the communication unit may be configured such that, when receiving the content, the communication unit receives the device identifiers for all devices on the content transfer route leading from the information providing device to the content transmitting user device. The controller may then be configured such that, when transmitting content stored in the storage unit, the controller configures the transmission data to be content together with the identifiers for all devices on the content transfer route leading from the information providing device to the content transmitting user device, as well as the device identifier of the apparatus itself.

An information processing system in accordance with a third embodiment includes: a content providing server that provides content; a managing server that executes output management of content to devices, as well as incentive distribution management using transfer device information with respect to the output content; an information providing device that initially outputs the content; and a plurality of user devices that acquire the output content from the information providing device or execute inter-device transfer of such content. In the system, when transferring content, the content transmitting user device that executes content transfer additionally transmits an identifier for the information providing device, as well as an identifier for the content transmitting user device. The content receiving user device that receives the content stores the identifier of the information providing device and the identifier of the content transmitting user device in memory. When making a product purchase on the basis of viewing the content, the content receiving user device outputs the device identifiers stored in memory. The managing server then uses the device identifiers output from a user device at the time of product purchase to designate the incentive recipients as being the device managers associated with the device identifiers.

Furthermore, in the information processing system in accordance with an embodiment, the content transmitting device may be configured such that, when transferring content, the content transmitting device additionally transmits an identifier for the information providing device, an identifier for the content transmitting device, as well as identifiers for all devices on the content transfer route leading from the information providing device to the content transmitting user device. The content receiving user device may then be configured to store identifiers for all devices on the content transfer route leading from the information providing device to the content transmitting user device in memory. When making a product purchase on the basis of viewing the content, the content receiving device outputs the device identifiers stored in memory. The managing server may then be configured to use the device identifiers for all devices on the content transfer route that were output from a user device at the time of the product purchase to designate the incentive recipients as being the device managers associated with the device identifiers.

Furthermore, in the information processing system in accordance with an embodiment, the content receiving user device may be configured such that, when making a product purchase on the basis of viewing the content, the content receiving device issues a notification to the content providing server containing the device identifiers stored in memory. The managing server may then be configured to use the device identifiers of the devices on the content transfer route that were issued to the content providing server to designate the incentive recipients as being the device managers associated with the device identifiers.

Furthermore, in the information processing system in accordance with an embodiment, the information providing device that initially outputs the content may be a public terminal enabling information acquisition therefrom by user devices.

Furthermore, in the information processing system in accordance with an embodiment, the information providing device that initially outputs the content may be a device that presents information, thereby enabling information acquisition therefrom over a network.

Furthermore, in the information processing system in accordance with an embodiment, the content may be product advertising content. The plurality of user devices may then be configured such that, when making a product purchase on the basis of viewing the advertising content, the purchasing user device issues a notification to the content providing server containing the device identifiers stored in memory.

Furthermore, in the information processing system in accordance with an embodiment, the managing server or the content providing server may be configured to dynamically set or modify the incentive distribution ratios for the incentive recipients.

An information processing method in accordance with a fourth embodiment includes the steps of: causing a content providing server to provide content; causing a managing server to execute output management of content to devices, as well as incentive distribution management using transfer device information with respect to the output content; causing an information providing device to initially output the content; when executing processing to transfer content output from the information providing device, causing a content transmitting user device to additionally transmit an identifier for the information providing device, as well as an identifier for the content transmitting device; causing a content receiving user device to store the identifier of the information providing device and the identifier of the content transmitting user device in memory, and when making a product purchase on the basis of viewing the content, causing the content receiving user device to output the device identifiers stored in memory; and causing a managing server to use the device identifiers output from a user device at the time of the product purchase to designate the incentive recipients as being the device managers associated with the device identifiers.

Furthermore, in the information processing method in accordance with an embodiment, the content transmitting device may be made to operate such that, when transferring content, the content transmitting device additionally transmits an identifier for the information providing device, an identifier for the content transmitting device, as well as identifiers for all devices on the content transfer route leading from the information providing device to the content transmitting user device. The content receiving user device may then be made to store identifiers for all devices on the content transfer route leading from the information providing device to the content transmitting user device in memory. When making a product purchase on the basis of viewing the content, the content receiving device is made to output the device identifiers stored in memory. The managing server may then be made to use the device identifiers of all devices on the content transfer route that were output from a user device at the time of the product purchase to designate the incentive recipients as being the device managers associated with the device identifiers.

Furthermore, in the information processing method in accordance with an embodiment, the content receiving user device may be made to operate such that, when making a product purchase on the basis of viewing the content, the content receiving user device issues a notification to the content providing server containing the device identifiers stored in memory. The managing server may then be made to use the device identifiers of the devices on the content transfer route that were issued to the content providing server to designate the incentive recipients as being the device managers associated with the device identifiers.

Furthermore, in the information processing method in accordance with an embodiment, the managing server or the content providing server may set or modify the incentive distribution ratios for the incentive recipients.

An information processing method in accordance with a fifth embodiment is executed by an information processing apparatus operating as a managing server that executes incentive distribution management using transfer device information with respect to content, the method including the steps of: causing a communication unit to receive inter-device transfer information with respect to output content from an information providing device, the information being in the form of device identifiers for at least the information providing device and one or more user devices that executed content transfers, and causing a controller to execute processing to designate the incentive recipients as being the device managers associated with the acquired device identifiers.

Furthermore, in the information processing method in accordance with an embodiment, the controller may be made to execute processing to designate the incentive recipients as being the manager of the information providing device and the device manager associated with the device identifier of the user device that transmitted the content to a user device that executed a product purchase on the basis of viewing the content.

Furthermore, in the information processing method in accordance with an embodiment, the controller may be made to execute processing to designate the incentive recipients as being the manager of the information providing device and the device managers associated with the device identifiers of all devices on the content transfer route leading to the user device that transmitted the content to a user device that executed a product purchase on the basis of viewing the content.

Furthermore, in the information processing method in accordance with an embodiment, the managing server may be configured to dynamically set or modify the incentive distribution ratios for the incentive recipients.

An information processing method in accordance with a sixth embodiment is executed by an information processing apparatus operating as a user device that acquires output content from an information providing device, or executes inter-device transfer of such content, the method including the steps of: causing a communication unit to receive content from the information providing device or another user device, while also receiving an identifier for the information providing device as well as an identifier for one or more content-transmitting user devices; causing a controller to store data received in the communicating step in a storage unit; and causing the controller to operate such that, when transmitting content stored in the storage unit, the controller configures the transmission data to be content together with both the identifier of the information providing device and the device identifier of the apparatus itself.

Furthermore, in the information processing method in accordance with an embodiment, the communication unit may be made to operate such that, when receiving the content, the communication unit receives the device identifiers of all devices on the content transfer route leading from the information providing device to the content transmitting user device. The controller may then be made to operate such that, when transmitting content stored in the storage unit, the controller configures the transmission data to be content together with the identifiers for all devices on the content transfer route leading from the information providing device to the content transmitting user device, as well as the device identifier of the apparatus itself.

A computer program product in accordance with a seventh embodiment causes information processing to be executed in an information processing apparatus operating as a managing server that executes incentive distribution management using transfer content device information with respect to content, the program product causing execution of the steps of: causing a communication unit to receive inter-device transfer information with respect to output content from an information providing device, the information being in the form of device identifiers for at least the information providing device and one or more user devices that executed content transfers; and causing a controller to execute processing to designate the incentive recipients as being the device managers associated with the acquired device identifiers.

A computer program product in accordance with an eighth embodiment causes information processing to be executed in an information processing apparatus operating as a user device that acquires output content from an information providing device, or executes inter-device transfer of such content, the program product causing execution of the steps of: causing a communication unit to receive content from the information providing device or another user device, while also receiving an identifier for the information providing device as well as an identifier for one or more content transmitting user devices; causing a controller to store data received in the communicating step in a storage unit; and causing the controller to operate such that, when transmitting content stored in the storage unit, the controller configures the transmission data to be content together with both the identifier of the information providing device and the device identifier of the apparatus itself.

A computer program product in accordance with an embodiment may be a computer program, providable by means of a storage medium or communication medium, provided in a computer-readable format to a general-purpose computer system able to execute various program code, for example. By providing such a program in a computer-readable format, processing in accordance with the program is realized on the computer system.

Further features and advantages will become apparent upon reading of the following detailed description of exemplary embodiments in conjunction with the attached drawings. Furthermore, in the present specification, a system refers to the logical assembly of a plurality of apparatus, and is not limited to respective apparatus being housed in a single physical unit.

According to an embodiment, when a product purchase is made by referring to product advertising or other content transferred among a plurality of user devices, identifiers for the one or more user devices that transferred the content are additionally transferred and stored in the memory of a user device at the time of inter-device content transfer. A managing server then acquires these device identifiers, thereby enabling the managing server to distribute incentive to device managers or users specified by the acquired device identifiers.

Additional features and advantages are described herein, and will be apparent from the following Detailed Description and the figures.

DETAILED DESCRIPTION

Hereinafter, an information processing system, an information processing apparatus, an information processing method, and a computer program product in accordance with embodiments will be described in detail and with reference to the accompanying drawings.

Figure 1:
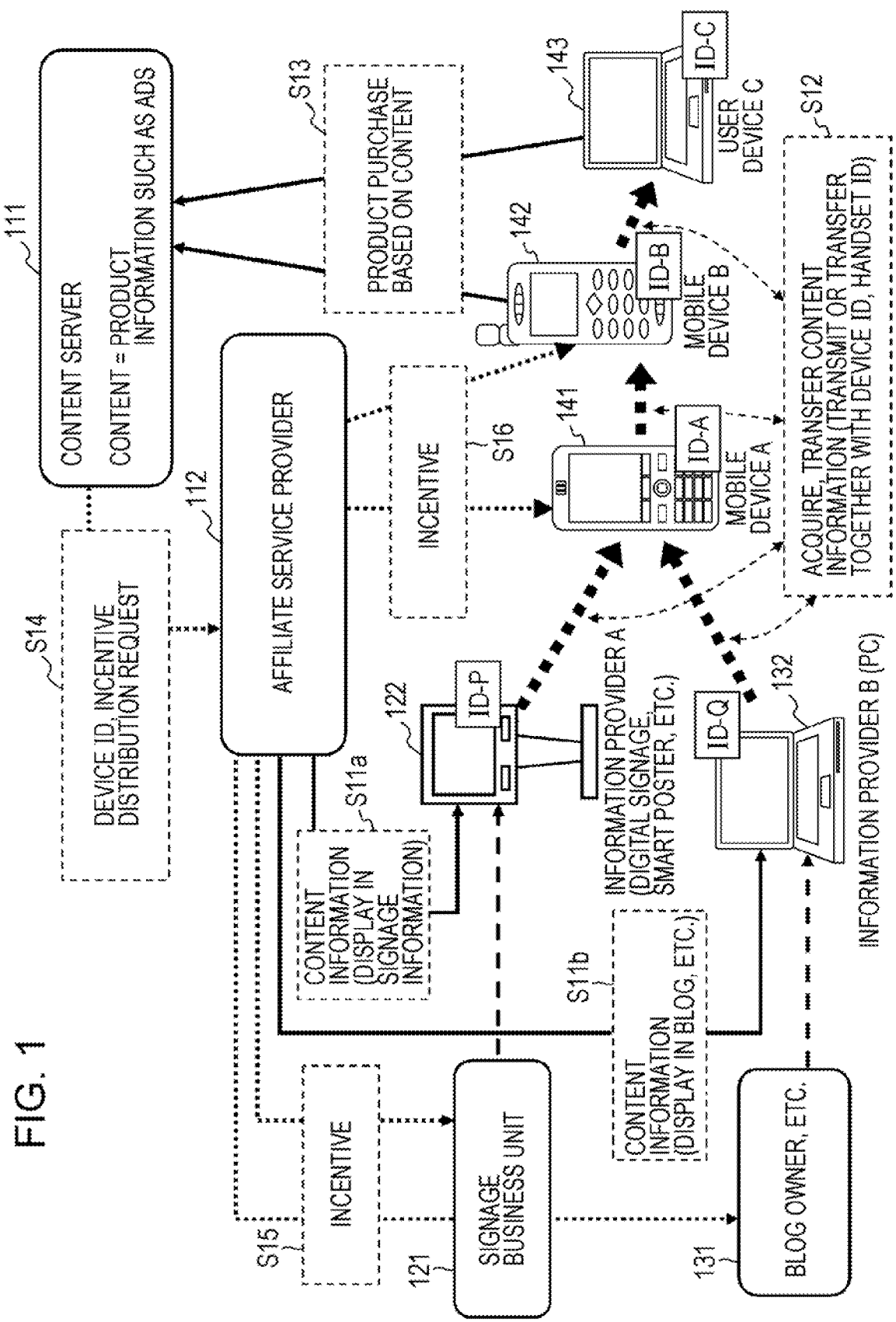
FIG. 1 is a diagram explaining the configuration and exemplary processing of an information processing system in accordance with an embodiment.

FIG. 1 illustrates an exemplary configuration of an information processing system in accordance with an embodiment. The content providing server 111 provides content in the form of advertising or other product information related to user-purchasable products to a managing server 112. The managing server 112 (i.e., an affiliate service provider) then presents the above content to information providing devices 122 and 123.

The managing server 112 is an advertising management server. More specifically, the managing server 112 presents content provided by a content providing server to the information providing devices 122 and 123. In addition, the managing server 112 also provides and distributes incentive following affiliate marketing techniques. The processing for the above will be later described.

FIG. 1 shows just a single content providing server, a single managing server, and two information providing devices, but it should be appreciated that FIG. 1 merely illustrates the relationships among representative apparatus, and that it is possible for a large number of such apparatus to exist on a network. FIG. 1 also shows just three user devices: a user device A 141, a user device B 142, and a user device C 143. However, a large number of user devices in addition to the above may also exist.

A variety of apparatus are usable as the above information providing devices. In the example shown in FIG. 1, the information providing device A 122 is an apparatus such as one of the following: digital signage that displays advertisements or other information to users on a display installed in a public place or shop; or, a smart poster provided with a microchip that can communicate at close-range and including functions for outputting information from the microchip to a user device. The information provided via the information providing device A 122 is managed by a signage business unit 121, for example.

As a more specific exemplary configuration of the information providing device A 122, consider a device equipped with an RFID (Radio Frequency IDentification) tag provided with an IC and an antenna enabling contactless communication. When a user's smart card, mobile phone, or similar user device A 141 with contactless communication functions approaches (i.e., is held near) the RFID tag, information stored in the memory of the RFID tag (such as product information) is transmitted to the user device A 141 and accumulated in internal memory.

Meanwhile, the information providing device B 132 is an Internet-connected PC or similar device. Various information can thus be presented by the information providing device B 132, as managed by a specific blog or other site owner 131. The information presented by the information providing device B 132 may be made viewable by being displayed on the user device A 141 over a network, and viewed information may be accumulated in the internal memory of the user device A 141.

Product advertising or similar content provided by the content providing server 111 is provided to the information providing device A 122 and the information providing device B 132 via the managing server 112, thereby causing both the information provided to the signage business unit 121 and the information provided to the blog or other site owner 131 to be presented.

The user device A 141 then acquires, from the information providing device A 122 or the information providing device B 132, the product advertising or similar content that was provided to the above information providing devices by the content providing server 111. The user device A 141 then accumulates the acquired content in internal memory. In the present embodiment, the information providing device A 122 and the information providing device B 132 that provide information to the user device A 141 output the content (i.e., the product information) together with their respective device identifiers (i.e., device IDs) to the user device A 141 at the time of information acquisition. The user device A 141 then stores content (i.e., the product information) in memory, together with the device ID of the information providing device A 122 or the information providing device B 132 from which the information was acquired.

Furthermore, it is also possible for the user device A 141 to transmit content accumulated in memory to a user device B 142 owned by another user. The user device B 142 then accumulates the transmitted content in internal memory. At the time of the above content transfer, the content transmitting user device A 141 outputs the content together with the device ID for the content acquisition source (i.e., the information providing device A 122 or the information providing device B 132) that was stored in memory at the time of the earlier content acquisition. Moreover, the user device A 141 also outputs the above together with its own ID (i.e., the device ID of the user device A 141).

The user device B 142 then performs one of the following, depending on the content transfer route:

(1) if content is received via the route leading from the information providing device A 122, to the user device A 141, to the user device B 142, then the content, the ID of the information providing device A 122, and the ID of the user device A 141 are stored in the memory of the user device B 142; or (2) if content is received via the route leading from the information providing device B 132, to the user device A 141, to the user device B 142, then the content, the ID of the information providing device B 132, and the ID of the user device A 141 are stored in the memory of the user device B 142.

In this way, the user device B 142 stores the content in memory, together with specific device IDs that depend on the content acquisition route.

It is also possible for the user device B 142 to transmit content accumulated in memory to a user device C 143 owned by another user. The user device C 143 then accumulates the transmitted content in internal memory.

The user device C 143 performs one of the following, depending on the content transfer route:

(3) if content is received via the route leading from the information providing device A 122, to the user device A 141, to the user device B 142, to the user device C 143, then the content, the ID of the information providing device A 122, the ID of the user device A 141, and the ID of the user device B 142 are stored in the memory of the user device C 143; or (4) if content is received via the route leading from the information providing device B 132, to the user device A 141, to the user device B 142, to the user device C 143, then the content, the ID of the information providing device B 132, the ID of the user device A 141, and the ID of the user device B 142 are stored in the memory of the user device C 143.

In this way, the user device C 143 stores the content in memory, together with specific device IDs that depend on the content acquisition route.

Thus, the user owning the user device B 142 views content (i.e., advertising) acquired via one of the following routes:

(1) from the information providing device A 122, to the user device A 141, to the user device B 142; or (2) from the information providing device B 132, to the user device A 141, to the user device B 142.

If the user of the user device B 142 likes the product described in the advertising, then that user is able to make a product purchase from the content providing server 111.

Similarly, the user owning the user device C 143 views content (i.e., advertising) acquired via one of the following routes:

(3) from the information providing device A 122, to the user device A 141, to the user device B 142, to the user device C 143; or (4) from the information providing device B 132, to the user device A 141, to the user device B 142, to the user device C 143.

If the user of the user device C 143 likes the product described in the advertising, then that user is able to make a product purchase from the content providing server 111.

At the time of a product purchase, the user device B 142, for example, transmits to the content providing server 111 the acquisition route information included in the content information stored in the memory of the user device B 142. In other words, the user device B 142 transmits content acquisition route information containing one of the following sets of information:

(1) the ID of the information providing device A 122 and the ID of the user device A 141; or (2) the ID of the information providing device B 132 and the ID of the user device A 141.

The content providing server 111 then provides the content acquisition route information to the managing server 112.

Similarly, at the time of a product purchase, the user device C 143 transmits to the content providing server 111 the acquisition route information included in the content information stored in the memory of the user device C 143. In other words, the user device C 143 transmits content acquisition route information containing one of the following sets of information:

(3) the ID of the information providing device A 122, the ID of the user device A 141, and the ID of the user device B 142; or (4) the ID of the information providing device B 132, the ID of the user device A 141, and the ID of the user device B 142.

The content providing server 111 then provides the content acquisition route information to the managing server 112.

Following the route information acquired from the content providing server 111, the managing server 112 provides incentive or other rewards to the managers or users of devices on the content route. In other words, the managing server 112 uses the device identifiers output from a user device at the time of a product purchase to designate the incentive recipients as being the device managers associated with the device identifiers.

In this way, in the present embodiment, not only is the original output device (i.e., the information providing device A 122 or the information providing device B 132) of the content tracked, but in addition, user devices that transferred content along the content route (i.e., devices such as the user device A 141 and the user device B 142) are also tracked, thereby enabling incentive or other rewards to be provided to the users of the devices along the content route. It should be appreciated herein that incentive can take many forms, such as cash, points, some kind of privileges or preferential information, or the provision of complimentary content, for example.

At the time of content transfer between user devices, the particular device IDs received by the content receiving device may be determined according to one of the following processing examples:

(Processing example 1) content is received together with two device IDs: the device ID of the original content source, and the device ID of the previous content transmitter that directly transmitted the content; or (Processing example 2) content is received together with the device ID of the original content source, the device ID of the previous content transmitter that directly transmitted the content, as well as the device IDs of all content transferring devices existing along the route leading from the original source to the previous content transmitter.

Herein, it is assumed that one of the above processing examples is implemented.

The processing sequence of steps S11 to S16 shown in FIG. 1 will now be described. Steps S11a and S11b illustrate content (i.e., the product advertising or other content provided by the content providing server 111) being displayed by the information providing device A 122 and the information providing device B 132. In the example shown in FIG. 1, the information providing device A 122 and the information providing device B 132 act as original sources of content information.

The subsequent step S12 is the acquisition and transfer of content information by the user devices A to C (141 to 143). At the time of content acquisition and transfer, each user device receives the content together with the device ID of the original content source and at least the device ID of the previous content transmitter. At this point, the user devices may also be made to transfer and receive the device ID of the original content source as well as the device IDs of all devices on the content transmission route.

In step S13, a product purchase is made with respect to the content (such as product advertising) presented on the user device B 142 or the user device C 143 after being received thereby. At the time of product purchase, the user device B 142 or the user device C 143 receives the product or product-related information, while additionally transmitting device information stored in memory to the content providing server 111. In other words, the user device B 142 or the user device C 143 transmits device IDs stored in memory to the content providing server 111 according to one of the following processing examples:

(Processing example 1) two device IDs are transmitted: the device ID of the original content source, and the device ID of the previous content transmitter that directly transmitted the content; or (Processing example 2) the device ID of the original content source and the device ID of the previous content transmitter that directly transmitted the content are transmitted, as well as the device IDs of all content-transferring devices existing along the route leading from the original source to the previous content transmitter.

In step S14, the content providing server 111 informs the managing server 112 of the device ID information acquired from the content purchasing user device, and subsequently requests incentive distribution.

On the basis of the device ID information received from the content providing server 111, the managing server 112 distributes incentive provided by the content providing server to the managers and users of the devices associated with the device IDs.

Herein, the managing server 112 retains association information associating the device IDs with the managers and users associated therewith. The managing server 112 then operates in accordance with the association information to specify the managers and users associated with the device IDs, and then provide incentive to the specified managers and users.

However, it should be appreciated that the content providing server 111 may also manage association information associating the device IDs with the managers and users associated therewith. The content providing server 111 may then specify the managers and users associated with the device IDs received from a user device, and issue a notification to the managing server 112 containing the specified managers and users. The managing server 112 may then follow the notification information to provide incentive to the specified managers and users.

In this way, in the process in accordance with an embodiment, not only is the original output device of content tracked, but in addition, user devices on the content route that transferred content are also tracked, thereby enabling the provision of incentive or other rewards to the users of devices on the content transfer route.

Herein, the managing server or the content providing server may also dynamically set or modify the incentive distribution ratios for the incentive recipients.

Exemplary data sent and received among respective devices in a content transfer process in accordance with an embodiment will now be described with reference to FIG. 2 and subsequent drawings.

In the examples shown in FIGS. 2 and 3, exemplary transfer data is shown for the case wherein the information providing device A 122 shown in FIG. 1 acts as the original source of the content (such as advertising information), and wherein the content is subsequently transferred to the user device A 141, the user device B 142 and the user device C 143, in that order. Furthermore, a processing example is implemented wherein each user device sends and receives content together with the device IDs of all devices existing on the content transfer route.

Figure 2:
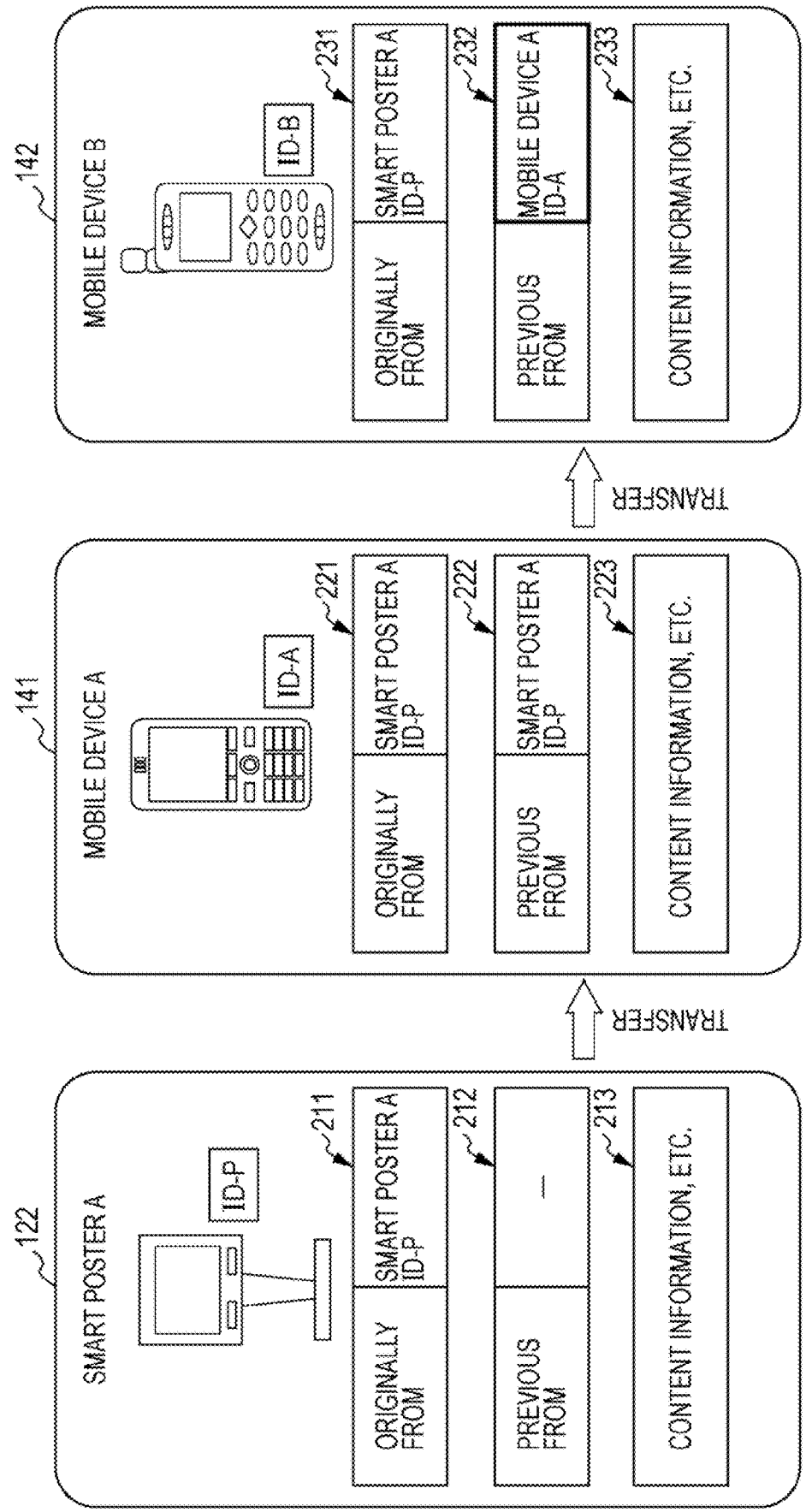
FIG. 2 is a diagram explaining exemplary data transferred and stored among respective apparatus and respective devices in an information processing system in accordance with an embodiment.

First, as shown in FIG. 2, the information providing device A 122 is storing the data 211 to 213 in internal memory, and then outputs the data 211 to 213 to a user device A. The user device A 141 receives the data 211 to 213 from the information providing device A 122, and then stores the data 221 to 223 in its own memory.

The data 211 to 213 stored in the memory of the information providing device A 122 contains the following information:

(1) an identifier indicating the original information source; herein, the ID (ID-P) of the information providing device A (a smart poster);

(2) an identifier indicating the previous information transmitter; herein, none; and (3) the product advertising or other content information.

The information providing device A 122 outputs the data 211 to 213 shown in FIG. 2 to the user device A 141. Herein, the ID [ID-P] of the transmitter is also sent at the time of data transmission.

Using the data 211 to 213 and the previous data transmitter ID [ID-P], the user device A 141 stores the data 221 to 223 shown in FIG. 2 in its own memory. More specifically, the data 221 to 223 contains the following information:

(1) an identifier indicating the original information source; herein, the ID [ID-P] of the information providing device A (a smart poster);

(2) an identifier indicating the previous information transmitter; herein, the ID [ID-P] of the information providing device A (a smart poster); and (3) the product advertising or other content information.

Next, the user device A 141 outputs the data 221 to 223 shown in FIG. 2 to the user device B 142. Herein, the ID [ID-A] of the transmitter is also sent at the time of data transmission.

Using the data 221 to 223 and the previous data transmitter ID [ID-A], the user device B 142 stores the data 231 to 233 shown in FIG. 2 in its own memory. More specifically, the data 231 to 233 contains the following information:

(1) an identifier indicating the original information source; herein, the ID [ID-P] of the information providing device A (a smart poster);

(2) an identifier indicating the previous information transmitter; herein, the ID [ID-A] of the user device A; and (3) the product advertising or other content information.

Figure 3:
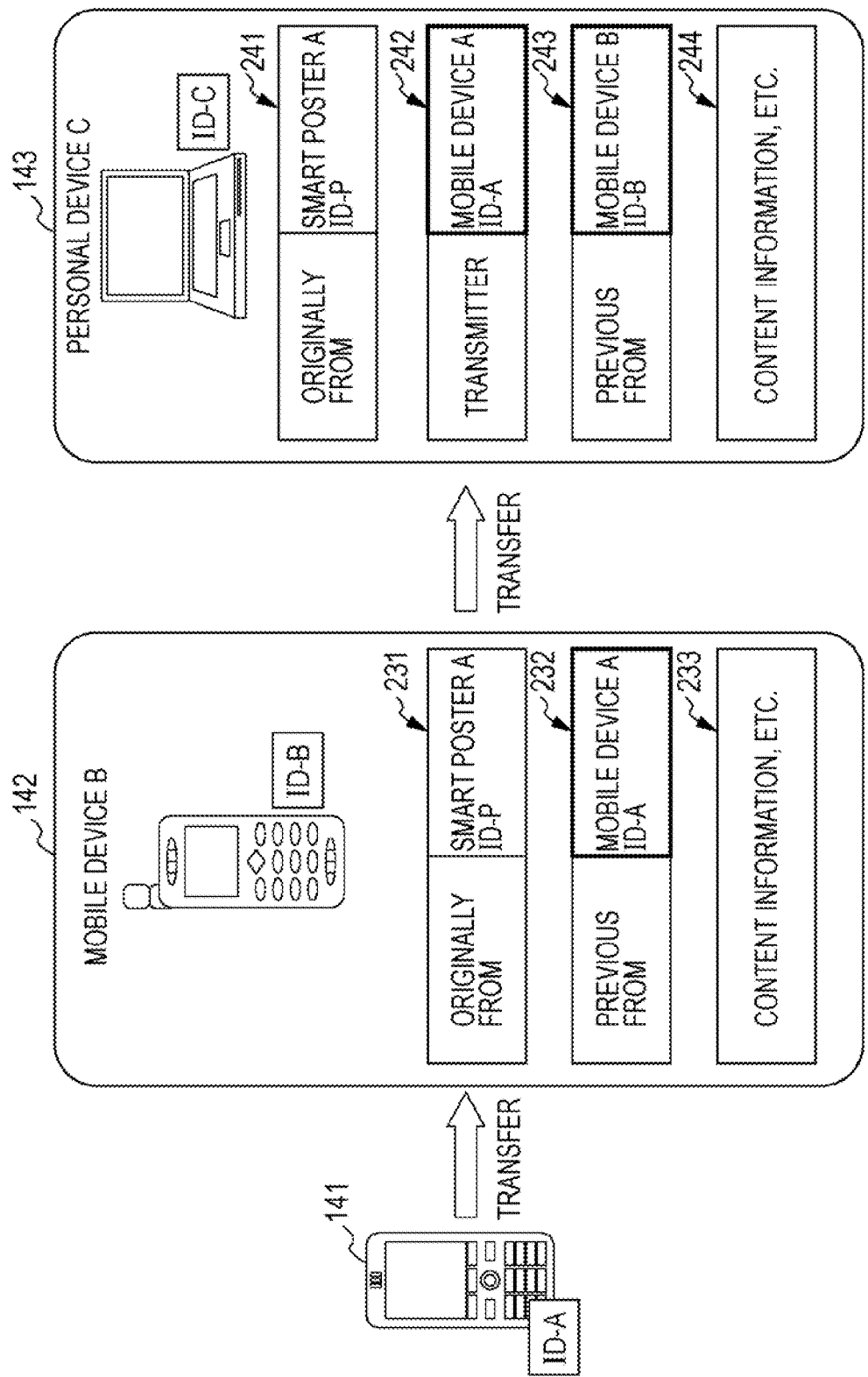
FIG. 3 is a diagram explaining exemplary data transferred and stored among respective apparatus and respective devices in an information processing system in accordance with an embodiment.

Next, as shown in FIG. 3, the user device B 142 outputs the data 231 to 233 shown in FIG. 3 to the user device C 143. Herein, the ID [ID-B] of the transmitter is also sent at the time of data transmission.

Using the data 231 to 233 and the previous data transmitter ID [ID-B], the user device C 143 stores the data 241 to 244 shown in FIG. 3 in its own memory. More specifically, the data 241 to 244 contains the following information:

(1) an identifier indicating the original information source; herein, the ID [ID-P] of the information providing device A (a smart poster);

(2) an identifier indicating the information relay device; herein, the ID [ID-A] of the user device A;

(3) an identifier indicating the previous information transmitter; herein, the ID [ID-B] of the user device B; and (4) the product advertising or other content information.

Thus, in the processing example wherein each user device sends and receives content together with the device IDs of all devices existing on the content transfer route, each device that receives content stores the device IDs of all devices existing on the content transfer route in memory. At the time of executing a product purchase, processing is conducted to issue all device IDs stored in memory to the content providing server 111. Furthermore, the above device IDs are then issued from the content providing server 111 to the managing server 112. The managing server 112 then uses the device IDs to distribute incentive to the managers and users associated with the devices having the respective device IDs.

In the processing example described with reference to FIGS. 2 and 3, each user device sends and receives content together with the device IDs of all devices existing on the content transfer route. However, as described earlier, processing may also be configured such that content is transferred together with just two device IDs: the device ID of the original content source, and the device ID of the previous content transmitter that directly transmitted the content. In the above processing example, the processing to send, receive, and store data in memory from the user device A 141 to the user device B 142 is similar to that described with reference to FIG. 2. However, the processing to transfer and store data in memory from the user device B 142 to the user device C 143 differs from that shown in FIG. 3.

The processing example for the above case will now be described with reference to FIG. 4. In the present processing example, the user device B 142 is storing the data 231 to 233 shown in FIG. 4 in its own memory. The data 231 to 233 is similar to that described with reference to FIGS. 2 and 3. More specifically, the data 231 to 233 contains the following information:

(1) an identifier indicating the original information source; herein, the ID [ID-P] of the information providing device A (a smart poster);

(2) an identifier indicating the previous information transmitter; herein, the ID [ID-A] of the user device A; and (3) the product advertising or other content information.

Figure 4:
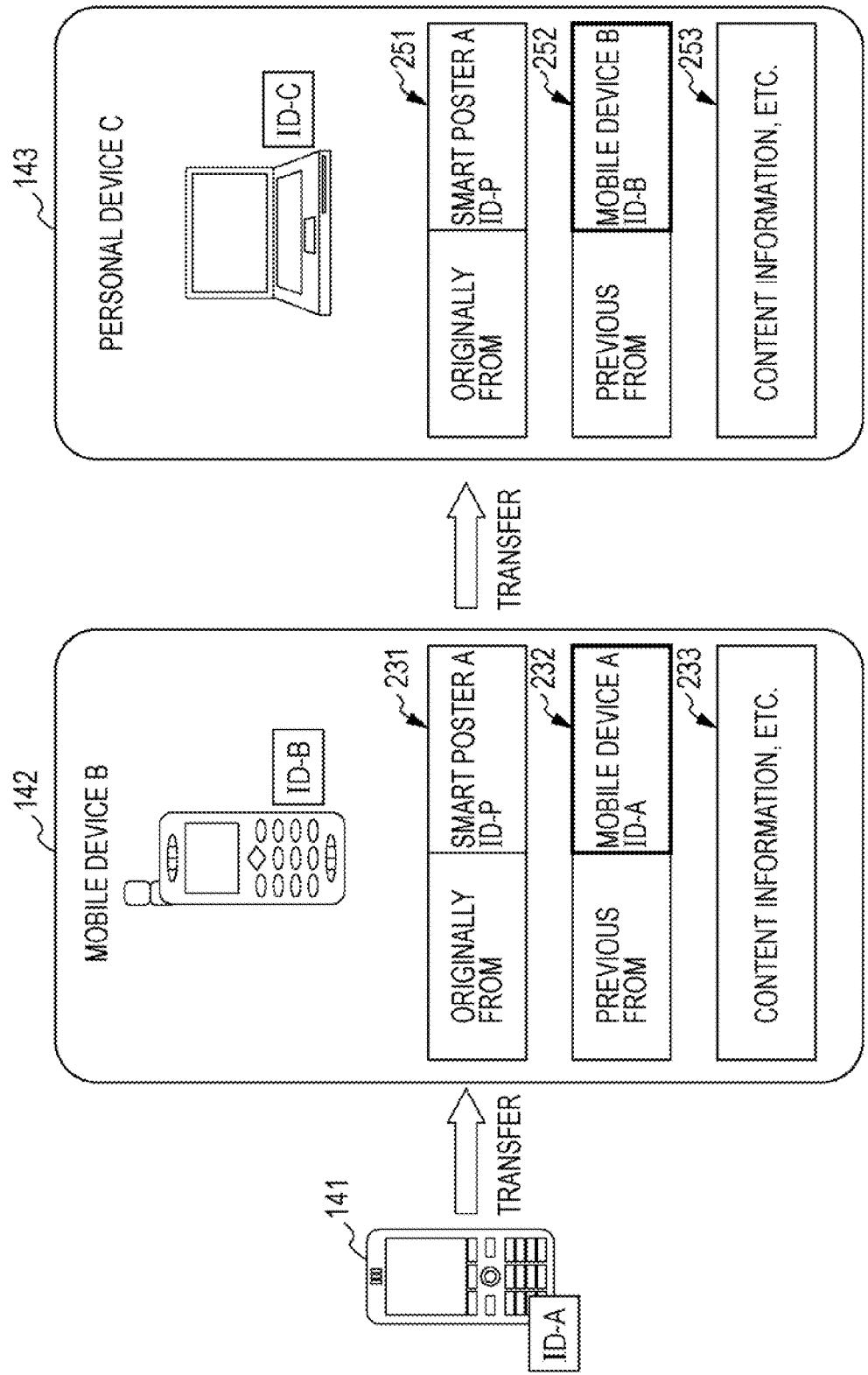
FIG. 4 is a diagram explaining exemplary data transferred and stored among respective apparatus and respective devices in an information processing system in accordance with an embodiment.

The user device B 142 then outputs the data 231 to 233 shown in FIG. 4 to the user device C 143. Herein, the ID [ID-B] of the transmitter is also sent at the time of data transmission.

Using the data 231 to 233 and the previous data transmitter ID [ID-B], the user device C 143 stores the data 251 to 253 shown in FIG. 4 in its own memory. More specifically, the data 251 to 253 contains the following information:

(1) an identifier indicating the original information source; herein, the ID [ID-P] of the information providing device A (a smart poster);

(2) an identifier indicating the previous information transmitter; herein, the ID [ID-B] of the user device B; and (3) the product advertising or other content information.

The present processing example differs from that described with reference to FIG. 3 in that the user device C 143 does not store an identifier indicating the information relay device (herein, the ID [ID-A] of the user device A).

In the present processing example, each user device stores content in memory together with just two device IDs: the device ID of the original content source, and the device ID of the previous content transmitter that directly transmitted the content. At the time of executing a product purchase, processing is conducted to issue the device IDs stored in memory (i.e., the device ID of the original content source and the device ID of the previous transmitter that directly transmitted the content) to the content providing server 111. Furthermore, the above device IDs are then issued from the content providing server 111 to the managing server 112. The managing server 112 then uses the device IDs to distribute incentive to the managers and users associated with the devices having the respective device IDs.

Thus, in the content transfer processing in accordance with an embodiment, when content is repeatedly transferred among user devices, not only is incentive provided to the original content source, but in addition, incentive is distributed to the owners of user devices that transferred the content and contributed to a product purchase. As a result, it becomes possible to encourage a greater number of users to actively transfer content, thereby enabling such users to improve advertising effects and help facilitate product purchases.

Lastly, an exemplary device configuration will be described with reference to FIG. 5, the exemplary device configuration being that of a device forming part of the system in accordance with an embodiment described with reference to FIG. 1. It is possible to realize the content providing server 111, the managing server 112, the information providing devices, and the user devices shown in FIG. 1 by means of typical PC configurations. Moreover, it is also possible to realize the user devices by means of mobile phones, smart cards, or similar technology.

Figure 5:
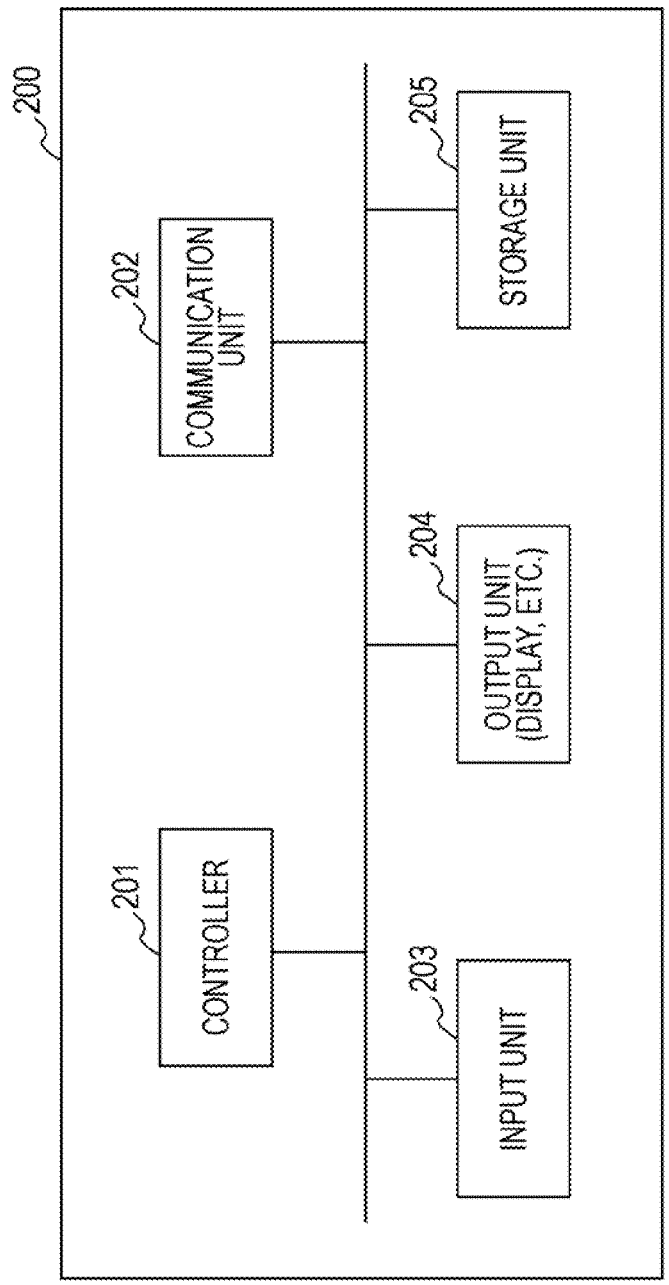
FIG. 5 is a diagram explaining an exemplary configuration of an apparatus constituting an information processing system in accordance with an embodiment.

A basic configuration for one of the above devices is given by way of example as the configuration of the information processing apparatus 200 shown in FIG. 5. More specifically, the information processing apparatus 200 includes: a controller 201 having a CPU or similar component that executes various programs; a communication unit 202 that communicates over a network or at close range; an input unit 203 that accepts operational information input by a user, an output unit 204 realized by a display or similar component; and a storage unit 205 used to store sent and received data, and also used as a storage area for programs or other information.

If, for example, the information processing apparatus 200 shown in FIG. 5 is the managing server 112, then the communication unit 202 receives information regarding inter-device content transfer in the form of device identifiers for the devices from the information providing device to the one or more user devices that transferred content. The controller 201 then executes processing to designate the incentive recipients as being the device managers associated with the acquired device identifiers.

For example, the controller 201 may execute processing to designate the incentive recipients as being the device manager of the information providing device, as well as the device manager associated with the device identifier of the user device that transmitted content to the user device that made a product purchase on the basis of viewing the content. Alternatively, the controller 201 may execute processing to designate the incentive recipients as being the device manager of the information providing device, as well as device managers associated with the device identifiers for all devices on the content transfer route leading to the user device that transmitted content to the user device that made a product purchase on the basis of viewing the content.

As another example, the information processing apparatus 200 shown in FIG. 5 may operate as a user device that acquires output content from an information providing device, or executes inter-device transfer of such content. In this case, at the time of receiving content from an information providing device or another user device, the communication unit 202 conducts processing to receive an identifier for the information providing device and an identifier for the content transmitting user device, and then store the received data in the storage unit 205. In addition, at the time of transmitting content stored in the storage unit 205, the controller 201 executes processing to configure the transmission data to be content together with the identifier of the information providing device and the device identifier of the information processing apparatus 200 itself.

It should also be appreciated that the above information processing apparatus 200 may also be configured such that, when the communication unit 202 receives content, the communication unit 202 also receives device identifiers for all devices on the content transfer route leading from the information providing device to the content transmitting user device. In addition, when the controller 201 transmits content stored in the storage unit 205, the controller 201 may configure the transmission data to be the content together with device identifiers for all devices on the content transfer route leading from the information providing device to the content transmitting device, as well as the device identifier of the information processing apparatus 200 itself.

The exemplary device configuration shown in FIG. 5 illustrates an example of a device usable as the content providing server 111, the managing server 112, the information providing devices, and the user devices shown in FIG. 1. However, the above may also be configured to include additional elements, or to lack a portion of the elements shown in FIG. 5. For example, it is possible to use a smart card as a user device, and in such a case, an input unit is typically not included.

In the case where a smart card is used as a user device, the smart card first acquires data from an information providing device, and then the data stored in the memory of the smart card is read by a PC having R/W functions, thereby enabling processing to transfer the data to another device or make a product purchase using the PC. When executing such processing, the smart card ID or the PC ID may then be transferred among respective user devices similarly to that described earlier and with reference to FIGS. 2 to 4.

Although the foregoing detailed description uses RFID as an example of the means whereby information is sent and received among user devices, methods other than the above may also be implemented, such as IrDA (infrared communication), Bluetooth™, and wireless LAN (IEEE 802.11).

In addition, it is possible to execute the series of processes described in the present specification by means of hardware, software, or a compound configuration of both hardware and software. In the case of execution by means of software, a program stating a processing sequence may be installed and executed in the memory of a computer built into special-purpose hardware. Alternatively, the program may be installed and executed on a general-purpose computer capable of executing various processing. For example, the program may be recorded onto a recording medium in advance and then installed onto a computer. In addition to being installed onto a computer from a recording medium, the program may also be received over a network such as a LAN (Local Area Network) or the Internet, and then installed to a recording medium such as an internal hard disk.

It should also be appreciated that the various processes described in the present specification are not limited to being executed in a time series following that described herein, but may also be executed in parallel or individually, depending on the processing capability of the apparatus executing the process or other factors. In addition, in the present specification, a system refers to the logical assembly of a plurality of apparatus, and is not limited to a configuration wherein respective apparatus are housed in a single physical unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing system, comprising:
an information providing device comprising a radio frequency identification (RFID) tag, wherein
the information providing device is configured to transmit content to at least one of a plurality of user devices,
the information providing device is one of a digital signage or a smart poster with contactless communication function, and
the information providing device is a public terminal that enables information acquisition by the plurality of user devices;
a content managing device configured to provide the content for the one of the digital signage or the smart poster, wherein the content is product information related to user-purchasable products;
a first user device of the plurality of user devices, wherein the first user device comprises:
a smart card;
a first memory; and
a first processor configured to:
receive first identifier information and the content from the information providing device by contactless communication between the information providing device and the first user device, wherein the content is transmitted from the RFID tag to the smart card by the contactless communication, and the first identifier information identifies the information providing device; and
control the first memory to store the first identifier information and the content;
a second user device of the plurality of user devices that comprises:
a second memory; and
a second processor configured to:
receive second identifier information and the content from the first user device; and
control the second memory to store the second identifier information and the content, wherein the second identifier information includes the first identifier information and third identifier information that identifies the first user device;
a third user device of the plurality of user devices that comprises:
a third memory; and
a third processor configured to:
receive fourth identifier information and the content from the second user device; and
control the third memory to store the fourth identifier information and the content, wherein the fourth identifier information includes the first identifier information that identifies the information providing device, the third identifier information that identifies the first user device, and fifth identifier information that identifies the second user device; and at least one fourth processor configured to:
receive inter-device transfer information of the content from the third user device at a time of a product purchase operation by the third user device, wherein the inter-device transfer information indicates that the content is transferred from the information providing device to the third user device, via the first user device and the second user device,
the product purchase operation is based on the content, and
the inter-device transfer information comprises the first identifier information, the second identifier information, and the fourth identifier information;
designate the information providing device as a first incentive recipient, the first user device as a second incentive recipient, and the second user device as a third incentive recipient, wherein the first incentive recipient, the second incentive recipient, and the third incentive recipient are designated based on the inter-device transfer information output at the time of the product purchase operation;
designate the content managing device as a fourth incentive recipient;
dynamically set an incentive distribution ratio for the designated first incentive recipient, the designated second incentive recipient, the designated third incentive recipient, and the fourth incentive recipient; and
manage incentive distribution for each of the designated first incentive recipient, the designated second incentive recipient, the designated third incentive recipient, and the fourth incentive recipient, based on the dynamically set incentive distribution ratio.

2. The information processing system of claim 1, wherein the at least one fourth processor is further configured to designate a plurality of incentive recipients associated with fifth identifier information of the plurality of user devices on a content transfer route that leads to a fourth user device of the plurality of user devices,
the fourth user device is configured to transmit the content to a fifth user device of the plurality of user devices, and
the fifth user device is configured to execute the product purchase operation based on the content.

3. The information processing system of claim 2, wherein the content transfer route includes:
a first transfer of the content from the information providing device to the first user device,
a second transfer of the content from the first user device to the second user device, and
a third transfer of the content from the second user device to the third user device.

4. The information processing system of claim 1, wherein the at least one fourth processor is further configured to modify the dynamically set incentive distribution ratio for the designated first incentive recipient, the designated second incentive recipient, and the designated third incentive recipient.

5. The information processing system of claim 1, wherein the at least one fourth processor is further configured to track inter-device transfers of the content in a content transfer route based on the received inter-device transfer information, and the content transfer route includes the information providing device, the first user device, the second user device, and the third user device.

6. An information processing apparatus, comprising:
a first memory; and
at least one first processor configured to:
receive first identifier information and content from a first user device;
control the first memory to store the first identifier information and the content, wherein the first identifier information includes second identifier information that identifies an information providing device, third identifier information that identifies a second user device, and fourth identifier information that identifies the first user device, wherein the information providing device is one of a digital signage or a smart poster with contactless communication function, the information providing device comprises a radio frequency identification (RFID) tag, and the information providing device is a public terminal that enables information acquisition by a plurality of user devices;
determine that a product purchase operation is executed at the information processing apparatus, wherein
the determination is based on the content transferred from the information providing device to the information processing apparatus via the second user device and the first user device,
the second user device comprises:
a smart card;
a second memory; and
a second processor that:
receives the content and the second identifier information from the information providing device by contactless communication between the information providing device and the second user device, wherein the content is transmitted from the RFID tag to the smart card by the contactless communication; and
controls the second memory to store the content and the second identifier information,
the first user device comprises:
a third memory; and
a third processor that:
receives the content and fifth identifier information from the second user device; and
controls the third memory to store the content and the fifth identifier information, wherein the fifth identifier information includes the second identifier information and the third identifier information,
a designation of the information providing device as a first incentive recipient, a designation of the second user device as a second incentive recipient, and a designation of the first user device as a third incentive recipient, are based on the first identifier information, the fifth identifier information, the second identifier information, and the determination that the product purchase operation is executed,
a designation of a content managing device as a fourth incentive recipient, wherein the content managing device provides the content for the one of the digital signage or the smart poster,
the first incentive recipient, the second incentive recipient, the third incentive recipient, and the fourth incentive recipient are designated at a time of the product purchase operation,
an incentive distribution ratio is dynamically set for the designated first incentive recipient, the designated second incentive recipient, the designated third incentive recipient, and the fourth incentive recipient, and
a corresponding incentive is distributed to each of the designated first incentive recipient, the designated second incentive recipient, the designated third incentive recipient, and the fourth incentive recipient, based on the dynamically set incentive distribution ratio.

7. The information processing apparatus of claim 6, wherein
the at least one first processor is further configured to:
receive, based on the reception of the content from the first user device, sixth identifier information of the plurality of user devices on a content transfer route that leads from the information providing device to the first user device via the second user device; and
transmit the content together with the sixth identifier information to a third user device of the plurality of user devices,
the plurality of user devices includes the first user device and the second user device,
the sixth identifier information includes seventh identifier information, and
the seventh identifier information identifies the information processing apparatus.

8. An information processing system, comprising:
a first processor configured to provide content;
a second processor configured to:
manage output of the content to a plurality of devices; and
manage incentive distribution based on transfer device information of the content;
an information providing device comprising a radio frequency identification (RFID) tag, wherein the information providing device is configured to transmit the content, the information providing device is one of a digital signage or a smart poster with contactless communication function, and the information providing device is a public terminal that enables information acquisition by a plurality of user devices; and
a content managing device configured to provide the content for the one of the digital signage or the smart poster, wherein the content is product information related to user-purchasable products;
the plurality of user devices configured to at least one of acquire the content transmitted from the information providing device or execute inter-device transfer of the content, wherein
the plurality of user devices comprises a first content transmitting user device that comprises:
a smart card;
a first memory; and
a third processor configured to:
acquire the content and first identifier information from the information providing device by contactless communication between the information providing device and the first content transmitting user device, wherein the content is transmitted from the RFID tag to the smart card by the contactless communication;
control the first memory to store the content and the first identifier information, wherein the first identifier information identifies the information providing device; and
transmit the content and second identifier information to a second content transmitting user device of the plurality of user devices, wherein the second identifier information includes the first identifier information and third identifier information that identifies the first content transmitting user device,
the second content transmitting user device of the plurality of user devices comprises:
a second memory; and
a fourth processor configured to:
receive the content and the second identifier information from the first content transmitting user device;
control the second memory to store the content and the second identifier information; and
transmit the content and fourth identifier information to a content receiving user device of the plurality of user devices, wherein the fourth identifier information includes the first identifier information that identifies the information providing device, the third identifier information that identifies the first content transmitting user device, and fifth identifier information that identifies the second content transmitting user device,
the content receiving user device of the plurality of user devices comprises:
a third memory; and
a fifth processor configured to:
receive the content and the fourth identifier information from the second content transmitting user device;
control the third memory to store the content and the fourth identifier information;
determine that a product purchase operation is executed based on the content transferred from the information providing device to the content receiving user device via the first content transmitting user device and the second content transmitting user device; and
output the stored fourth identifier information based on the product purchase operation, and
the second processor is further configured to:
designate the information providing device as a first incentive recipient, the first content transmitting user device as a second incentive recipient, and the second content transmitting user device as a third incentive recipient, based on the first identifier information, the second identifier information, and the fourth identifier information, wherein the first incentive recipient, the second incentive recipient, and the third incentive recipient are designated based on the fourth identifier information output at a time of the product purchase operation;
designate the content managing device as a fourth incentive recipient;
dynamically set a first incentive distribution ratio for the designated first incentive recipient, the designated second incentive recipient, the designated third incentive recipient, and the fourth incentive recipient;

manage the incentive distribution for each of the designated first incentive recipient, the designated second incentive recipient, the designated third incentive recipient, and the fourth incentive recipient, based on the dynamically set first incentive distribution ratio; and designate the first incentive recipient, the second incentive recipient, and the third incentive recipient as device managers based on the stored fourth identifier information, wherein the first incentive recipient, the second incentive recipient, and the third incentive recipient are associated with the first identifier information, the third identifier information, and the fifth identifier information, respectively.

9. The information processing system of claim 8, wherein the fourth processor of the second content transmitting user device is further configured to transmit sixth identifier information of the plurality of devices on a content transfer route to the content receiving user device, the content transfer route leads from the information providing device to the second content transmitting user device via the first content transmitting user device, the fifth processor of the content receiving user device is further configured to output the sixth identifier information of the plurality of devices to the first processor based on the product purchase operation, and the second processor is further configured to:

designate the plurality of devices on the content transfer route as incentive recipients based on the sixth identifier information of the plurality of devices output from the content receiving user device at the time of the product purchase operation;

dynamically set a second incentive distribution ratio for the designated incentive recipients; and manage the incentive distribution for each of the designated incentive recipients based on the dynamically set second incentive distribution ratio.

10. The information processing system of claim 8, wherein the fifth processor of the content receiving user device is further configured to issue a notification to the first processor based on the product purchase operation, the notification contains the first identifier information, the second identifier information, and the fourth identifier information stored in the third memory, and the second processor is further configured to designate incentive recipients based on the notification issued to the first processor.

11. The information processing system of claim 8, wherein the information providing device is further configured to enable the information acquisition over a network.

12. The information processing system of claim 8, wherein the content is product advertising content, the plurality of user devices is further configured to issue a notification to the first processor based on the product purchase operation, the notification contains the first identifier information, the second identifier information, and the fourth identifier information, and the product purchase operation is based on the product advertising content.

13. The information processing system of claim 8, wherein one of the second processor or the first processor is further configured to modify the dynamically set first incentive distribution ratio for the designated first incentive recipient, the designated second incentive recipient, and the designated third incentive recipient.

14. The information processing system of claim 9, wherein the fifth processor of the content receiving user device is further configured to issue a notification to the first processor based on the product purchase operation, the notification contains the sixth identifier information, and the second processor is further configured to designate the incentive recipients based on the notification issued to the first processor.

15. The information processing system of claim 9, wherein the information providing device is further configured to enable the information acquisition over a network.

16. The information processing system of claim 9, wherein the content is product advertising content, the plurality of user devices is further configured to issue a notification to the first processor based on the product purchase operation, the notification contains the sixth identifier information, and the product purchase operation is based on the product advertising content.

17. The information processing system of claim 9, wherein one of the second processor or the first processor is further configured to modify the dynamically set second incentive distribution ratio for the designated incentive recipients.

18. A method, comprising:

in an information processing system:

tracking content transfers among a plurality of devices:

causing a first processor to provide content;

causing a second processor to:

manage output of the content to the plurality of devices; and manage incentive distribution based on transfer device information of the content;

causing an information providing device to transmit the content, wherein the information providing device is one of a digital signage or a smart poster with contactless communication function, the information providing device comprises a radio frequency identification (RFID) tag, and the information providing device is a public terminal that enables information acquisition by a plurality of user devices;

causing a content managing device to provide the content for the one of the digital signage or the smart poster, wherein the content is product information related to user-purchasable products, wherein a first content transmitting user device of the plurality of devices comprises a smart card, a first memory, and a third processor;

causing the third processor to:

acquire the content and first identifier information from the information providing device by contactless communication between the information providing device and the first content transmitting user device, wherein the content is transmitted from the RFID tag to the smart card by the contactless communication;

control the first memory to store the content and the first identifier information, wherein the first identifier information identifies the information providing device; and transmit the content and second identifier information to a second content transmitting user device of the plurality of devices, wherein the second identifier information includes the first identifier information and third identifier information that identifies the first content transmitting user device, wherein the second content transmitting user device of the plurality of devices comprises a second memory and a fourth processor;

causing the fourth processor to:

acquire the content and the second identifier information from the first content transmitting user device;

control the second memory to store the content and the second identifier information; and transmit the content and fourth identifier information to a content receiving user device of the plurality of devices, wherein the fourth identifier information includes the first identifier information that identifies the information providing device, the third identifier information that identifies the first content transmitting user device, and fifth identifier information that identifies the second content transmitting user device, wherein the content receiving user device of the plurality of devices comprises a third memory and a fifth processor;

causing the fifth processor configured to:

acquire the content and the fourth identifier information from the second content transmitting user device;

control the third memory to store the content and the fourth identifier information;

determine that a product purchase operation is executed based on the content transferred from the information providing device to the content receiving user device via the first content transmitting user device and the second content transmitting user device; and output the stored fourth identifier information based on the product purchase operation; and causing the second processor to:

designate the information providing device as a first incentive recipient, the first content transmitting user device as a second incentive recipient, and the second content transmitting user device as a third incentive recipient, based on the first identifier information, the second identifier information, and the fourth identifier information, wherein the first incentive recipient, the second incentive recipient, and the third incentive recipient are designated based on the fourth identifier information output at a time of the product purchase operation;

designate the content managing device as a fourth incentive recipient;

dynamically set an incentive distribution ratio for the designated first incentive recipient, the designated second incentive recipient, the designated third incentive recipient, and the fourth incentive recipient;

manage the incentive distribution for each of the designated first incentive recipient, the designated second incentive recipient, the designated third incentive recipient, and the fourth incentive recipient, based on the dynamically set incentive distribution ratio; and designate the first incentive recipient, the second incentive recipient, and the third incentive recipient as device managers based on the stored fourth identifier information, wherein the first incentive recipient, the second incentive recipient, and the third incentive recipient are associated with the first identifier information, the third identifier information, and the fifth identifier information, respectively.

19. The method of claim 18, further comprising:

transmitting, by the fourth processor of the second content transmitting user device, sixth identifier information of the plurality of devices on a content transfer route to the content receiving user device, wherein the content transfer route leads from the information providing device to the second content transmitting user device via the first content transmitting user device;

outputting, by the fifth processor of the content receiving user device, the sixth identifier information to the first processor based on the product purchase operation; and designating, by the second processor, incentive recipients as the device managers based on the sixth identifier information for the plurality of devices output from content receiving user device at the time of the product purchase operation.

20. The method of claim 18, further comprising:

issuing, by the fifth processor of the content receiving user device, a notification to the first processor based on the product purchase operation, wherein the notification contains the first identifier information, the second identifier information, and the fourth identifier information stored in the third memory; and designating, by the second processor, incentive recipients as the device managers based on the notification.

21. The method of claim 18, further comprising causing one of the second processor or the first processor to modify the dynamically set incentive distribution ratio for the designated first incentive recipient, the designated second incentive recipient, and the designated third incentive recipient.

22. The method of claim 19, further comprising:

issuing, by the fifth processor of the content receiving user device, a notification to the first processor based on the product purchase operation, wherein the notification contains the fourth identifier information; and designating, by the second processor, the incentive recipients as the device managers associated with the fourth identifier information based on the notification issued to the first processor.

23. A method, comprising:

causing an information providing device to transmit content to at least one of a plurality of user devices, wherein the information providing device is one of a digital signage or a smart poster with contactless communication function, the information providing device comprises a radio frequency identification (RFID) tag, and the information providing device is a public terminal that enables information acquisition by the plurality of user devices;

causing a content managing device to provide the content for the one of the digital signage or the smart poster, wherein the content is product information related to user-purchasable products;

causing a first processor of a first user device of the plurality of user devices to:
  receive first identifier information and the content from the information providing device by contactless communication between the information providing device and the first user device, wherein the first identifier information identifies the information providing device, the first user device comprises a smart card, and the content is transmitted from the RFID tag to the smart card by the contactless communication; and
  control a first memory of the first user device to store the first identifier information and the content;

causing a second processor of a second user device of the plurality of user devices to:
  receive second identifier information and the content from the first user device, and
  control a second memory of the second user device to store the second identifier information and the content, wherein the second identifier information includes the first identifier information and third identifier information that identifies the first user device;

causing a third processor of a third user device of the plurality of user devices to:
  receive fourth identifier information and the content from the second user device, and
  control a third memory of the third user device to store the fourth identifier information and the content, wherein the fourth identifier information includes the first identifier information that identifies the information providing device, the third identifier information that identifies the first user device, and fifth identifier information that identifies the second user device; and causing at least one fourth processor to:
  receive inter-device transfer information of the content from the third user device at a time of a product purchase operation by the third user device, wherein the inter-device transfer information indicates that the content is transferred from the information providing device to the third user device, via the first user device and the second user device, the product purchase operation is based on the content, and the inter-device transfer information comprises the first identifier information, the second identifier information, and the fourth identifier information,
  designate the information providing device as a first incentive recipient, the first user device as a second incentive recipient, and the second user device as a third incentive recipient, wherein the first incentive recipient, the second incentive recipient, and the third incentive recipient are designated based on the inter-device transfer information output at the time of the product purchase operation,
  designate the content managing device as a fourth incentive recipient,
  dynamically set a first incentive distribution ratio for the designated first incentive recipient, the designated second incentive recipient, the designated third incentive recipient, and the fourth incentive recipient, and
  manage incentive distribution for each of the designated first incentive recipient, the designated second incentive recipient, the designated third incentive recipient, and the fourth incentive recipient, based on the dynamically set first incentive distribution ratio.

24. The method of claim 23, further comprising designating the first incentive recipient, the second incentive recipient, and the third incentive recipient based on the third user device, wherein the third user device executes the product purchase operation based on the content.

25. The method of claim 23, further comprising designating a plurality of incentive recipients associated with sixth identifier information of the plurality of user devices on a content transfer route, wherein
  the content transfer route leads to a fourth user device of the plurality of user devices,
  the fourth user device is configured to transmit the content to a fifth user device of the plurality of user devices, and
  the fifth user device is configured to execute the product purchase operation based on the content.

26. The method of claim 25, further comprising causing the at least one fourth processor to one of dynamically set or modify a second incentive distribution ratio for the designated plurality of incentive recipients.

27. A method, comprising:
in an information processing apparatus:
  receiving, by at least one first processor of the information processing apparatus, first identifier information and content from a first user device;
  controlling, by the at least one first processor, a first memory of the information processing apparatus to store the first identifier information and the content, wherein the first identifier information includes second identifier information that identifies an information providing device, third identifier information that identifies a second user device, and fourth identifier information that identifies the first user device, wherein
    the information providing device is one of a digital signage or a smart poster with contactless communication function, the information providing device comprises a radio frequency identification (RFID) tag, and the information providing device is a public terminal that enables information acquisition by a plurality of user devices,
    the second user device comprises:
      a smart card;
      a second memory; and
      a second processor that:
        receives the content and the second identifier information from the information providing device by contactless communication between the information providing device and the second user device, wherein the content is transmitted from the RFID tag to the smart card by the contactless communication; and
        controls the second memory to store the content and the second identifier information, and
    the first user device comprises:
      a third memory; and
      a third processor that:
        receives the content and fifth identifier information from the second user device; and
        controls the third memory to store the content and the fifth identifier information, wherein the fifth identifier information includes the second identifier information and the third identifier information;

determining, by the at least one first processor, that a product purchase operation is executed at the information processing apparatus based on the content transferred from the information providing device to the information processing apparatus via the second user device and the first user device;

designating, by the at least one first processor, the information providing device as a first incentive recipient, the second user device as a second incentive recipient, and the first user device as a third incentive recipient, based on the first identifier information, the fifth identifier information, the second identifier information, and the determination that the product purchase operation is executed, wherein the first incentive recipient, the second incentive recipient, and the third incentive recipient are designated at a time of the product purchase operation;

designating, by the at least one first processor, a content managing device as a fourth incentive recipient, wherein the content managing device configured to provide the content for the one of the digital signage or the smart poster, wherein the content is product information related to user-purchasable products;

dynamically setting, by the at least one first processor, an incentive distribution ratio for the designated first incentive recipient, the designated second incentive recipient, the designated third incentive recipient, and the fourth incentive recipient; and managing, by the at least one first processor, incentive distribution for each of the designated first incentive recipient, the designated second incentive recipient, the designated third incentive recipient, and the fourth incentive recipient, based on the dynamically set incentive distribution ratio.

28. The method of claim 27, further comprising:

receiving, by the at least one first processor, based on the reception of the content from the first user device, sixth identifier information of the plurality of user devices on a content transfer route leading from the information providing device to the first user device via the second user device; and transmitting, by the at least one first processor, the content together with the sixth identifier information to a third user device, wherein
the sixth identifier information includes seventh identifier information, and
the seventh identifier information identifies the information processing apparatus.

29. A non-transitory computer-readable medium having stored thereon computer-executable instructions, which when executed by at least one processor, cause the at least one processor to execute operations, the operations comprising:

causing an information providing device to transmit content to at least one of a plurality of user devices, wherein the information providing device is one of a digital signage or a smart poster with contactless communication function, the information providing device comprises a radio frequency identification (RFID) tag, and the information providing device is a public terminal that enables information acquisition by the plurality of user devices;

causing a content managing device configured to provide the content for the one of the digital signage or the smart poster, wherein the content is product information related to user-purchasable products;

causing a first processor of a first user device of the plurality of user devices to:
receive first identifier information and the content from the information providing device by contactless communication between the information providing device and the first user device, wherein the first identifier information identifies the information providing device, the first user device comprises a smart card, and the content is transmitted from the RFID tag to the smart card by the contactless communication; and
control a first memory of the first user device to store the first identifier information and the content;

causing a second processor of a second user device of the plurality of user devices to:
receive second identifier information and the content from the first user device, and
control a second memory of the second user device to store the second identifier information and the content, wherein the second identifier information includes the first identifier information and third identifier information that identifies the first user device;

causing a third processor of a third user device of the plurality of user devices to:
receive fourth identifier information and the content from the second user device, and
control a third memory of the third user device to store the fourth identifier information and the content, wherein the fourth identifier information includes the first identifier information that identifies the information providing device, the third identifier information that identifies the first user device, and fifth identifier information that identifies the second user device;

receiving inter-device transfer information of the content from the third user device at a time of a product purchase operation by the third user device, wherein
the inter-device transfer information indicates that the content is transferred from the information providing device to the third user device, via the first user device and the second user device,
the product purchase operation is based on the content, and
the inter-device transfer information comprises the first identifier information, the second identifier information, and the fourth identifier information;

designating the information providing device as a first incentive recipient, the first user device as a second incentive recipient, and the second user device as a third incentive recipient, wherein the first incentive recipient, the second incentive recipient, and the third incentive recipient are designated based on the inter-device transfer information output at the time of the product purchase operation;

designating the content managing device as a fourth incentive recipient;

dynamically setting an incentive distribution ratio for the designated first incentive recipient, the designated second incentive recipient, the designated third incentive recipient, and the fourth incentive recipient; and managing incentive distribution for each of the designated first incentive recipient, the designated second incentive recipient, the designated third incentive recipient, and the fourth incentive recipient, based on the dynamically set incentive distribution ratio.

30. A non-transitory computer-readable medium having stored thereon computer-executable instructions, which when executed by at least one first processor of a first user device of a plurality of user devices, cause the at least one first processor to execute operations, the operations comprising:

receiving first identifier information and content from a second user device of the plurality of user devices;

controlling a first memory of the first user device to store the first identifier information and the content, wherein the first identifier information includes second identifier information that identifies an information providing device, third identifier information that identifies a third user device of the plurality of user devices, and fourth identifier information that identifies the second user device, wherein the information providing device is one of a digital signage or a smart poster with contactless communication function, the information providing device comprises a radio frequency identification (RFID) tag, and the information providing device is a public terminal that enables information acquisition by the plurality of user devices, the third user device comprises:
 a smart card;
 a second memory;
 a second processor that:
  receives the second identifier information and the content from the information providing device by contactless communication between the information providing device and the third user device, wherein the content is transmitted from the RFID tag to the smart card by the contactless communication; and
  controls the second memory to store the second identifier information and the content, and the second user device comprises:
 a third memory;
 a third processor that:
  receives fifth identifier information and the content from the third user device; and
  controls the third memory to store the fifth identifier information and the content, wherein the fifth identifier information includes the second identifier information and the third identifier information;

determining that a product purchase operation is executed at the first user device based on the content transferred from the information providing device to the first user device, via the third user device and the second user device;

designating the information providing device as a first incentive recipient, the third user device as a second incentive recipient, and the second user device as a third incentive recipient, based on the first identifier information, the fifth identifier information, the second identifier information, and the determination that the product purchase operation is executed, wherein the first incentive recipient, the second incentive recipient, and the third incentive recipient are designated at a time of the product purchase operation;

designating a content managing device as a fourth incentive recipient, wherein the content managing device provides the content for the one of the digital signage or the smart poster, wherein the content is product information related to user-purchasable products;

dynamically setting an incentive distribution ratio for the designated first incentive recipient, the designated second incentive recipient, the designated third incentive recipient, and the fourth incentive recipient; and managing incentive distribution for each of the designated first incentive recipient, the designated second incentive recipient, the designated third incentive recipient, the fourth incentive recipient based on the dynamically set incentive distribution ratio.

* * * * *